United States Patent [19]

Crisman

[11] Patent Number: 5,074,811

[45] Date of Patent: Dec. 24, 1991

[54] SOLAR POWERED TROLLING MOTOR

[76] Inventor: Dusty S. Crisman, Box 1394, Lusk, Wyo. 82225

[21] Appl. No.: 612,544

[22] Filed: Nov. 13, 1990

[51] Int. Cl.⁵ ............................................. B60L 11/02
[52] U.S. Cl. ......................................... 440/6; 60/496
[58] Field of Search ............... 440/6, 7, 113; 180/220; 60/496

[56] References Cited

U.S. PATENT DOCUMENTS 4,871,042 10/1989 Hsu et al. ..................... 180/220

FOREIGN PATENT DOCUMENTS 2484356 12/1981 France ................................ 440/6
637584 8/1983 Switzerland ...................... 440/6

Primary Examiner—Jesus D. Sotelo
Attorney, Agent, or Firm—Leon Gilden

[57] ABSTRACT

An apparatus including a trolling motor housing, including a solar cell organization permitting selective use of solar cells or a battery to motivate the trolling motor drive. Modification of the invention includes manipulation apparatus for spacing and permitting rotation of the solar cells relative to the trolling motor housing in use.

4 Claims, 4 Drawing Sheets

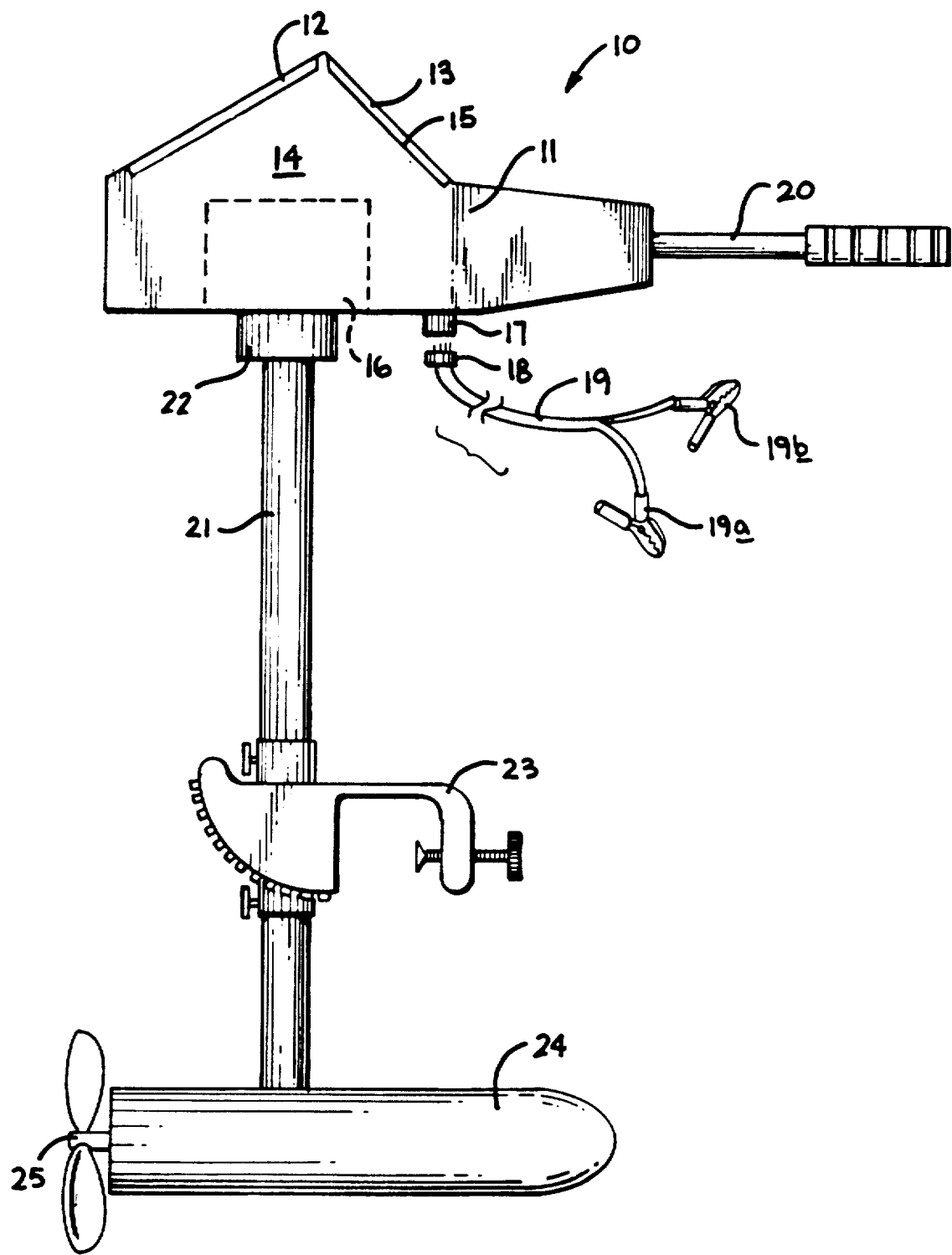

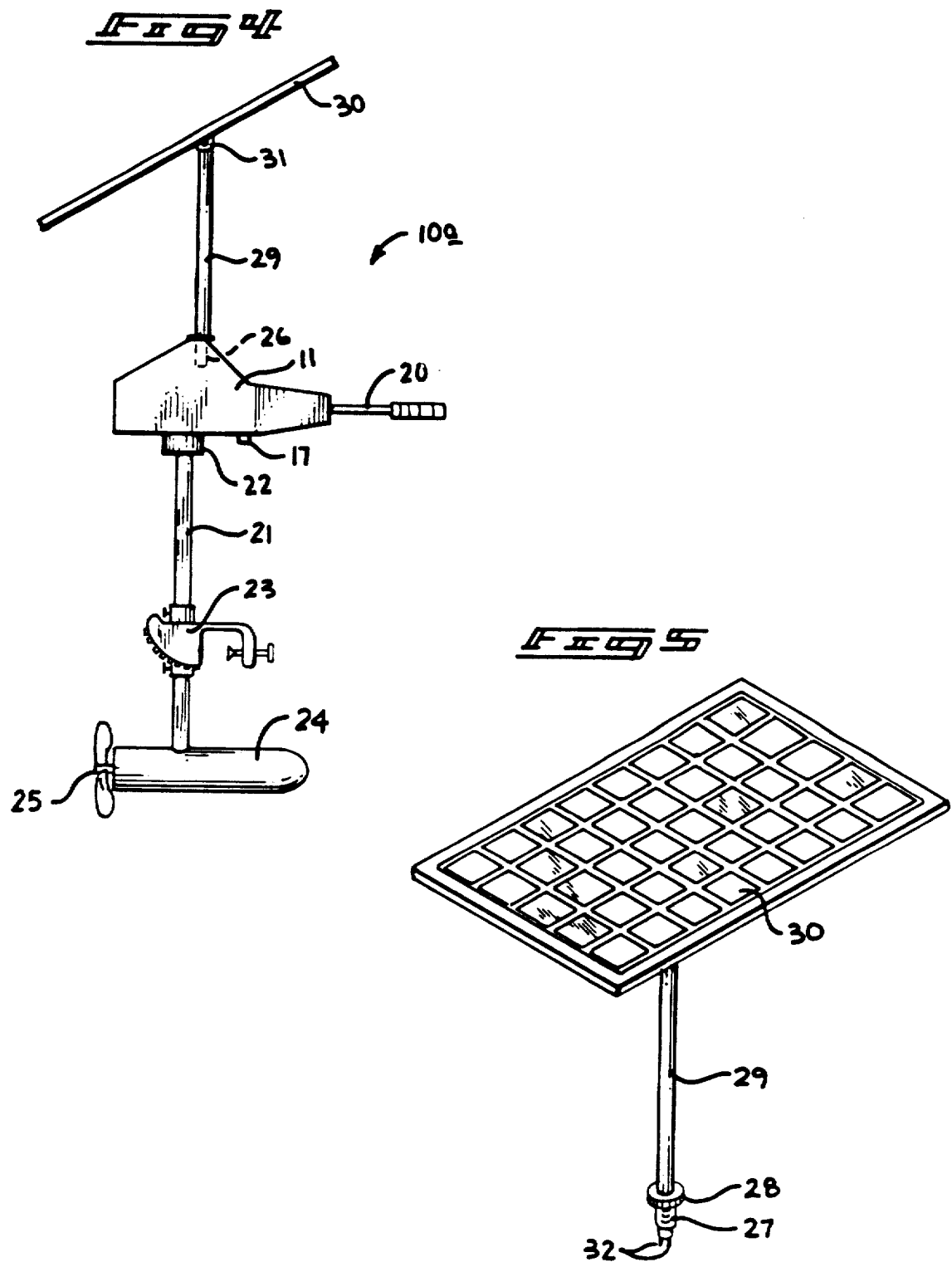

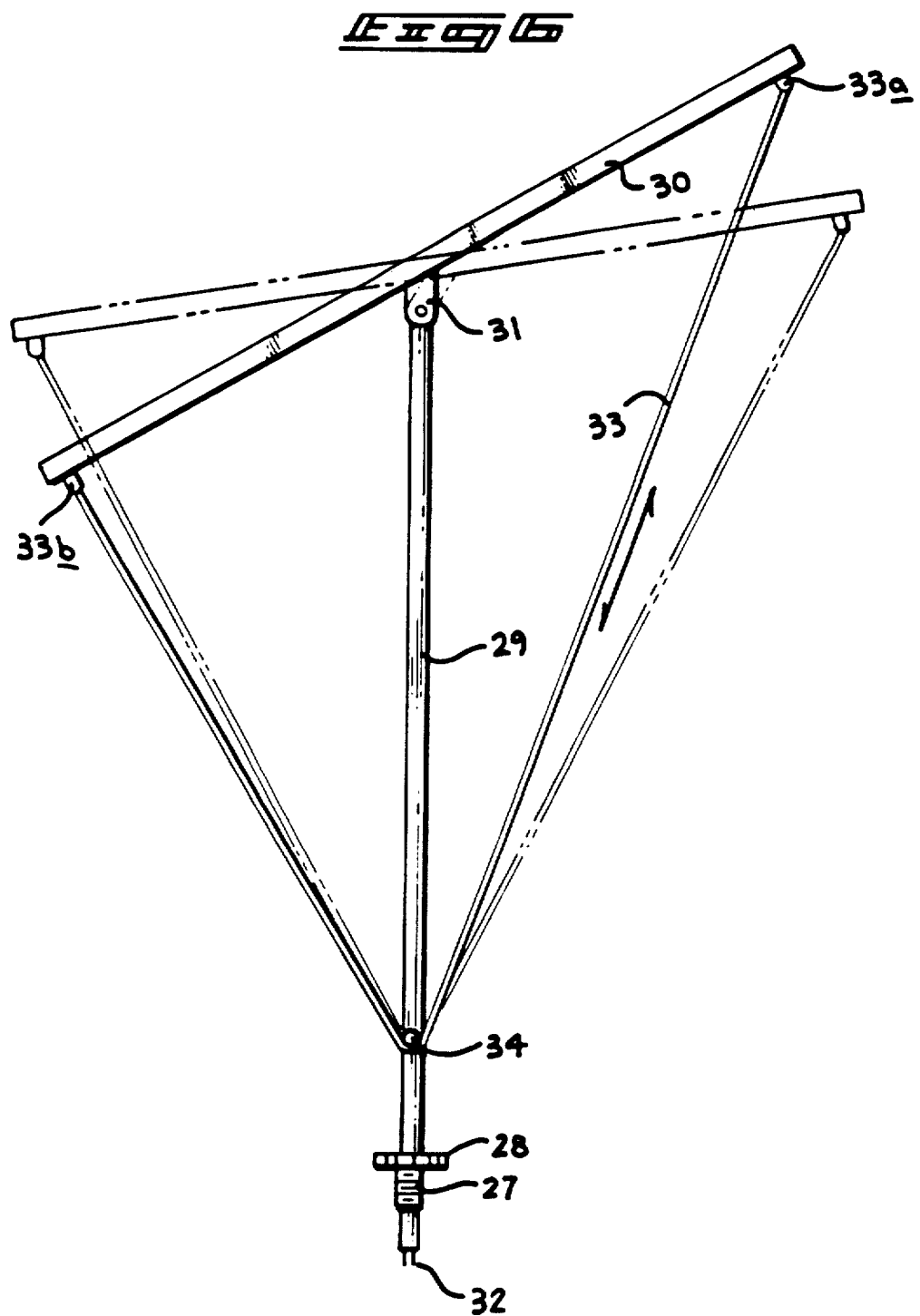

SOLAR POWERED TROLLING MOTOR

BACKGROUND OF THE INVENTION

1. Field of the Invention

The field of invention relates to electric trolling motors, and more particularly pertains to a new and improved solar powered electric trolling motor permitting use of solar energy to motivate an associated direct current electric motor in the trolling motor organization.

2. Description of the Prior Art

Trolling motors of various types have been utilized in the prior art. Typically, they are utilized in a fishing situation and such situations are predominately carried out during periods of sunny weather, as is typical of the sport that is participate in for enjoyment and relaxation. The instant invention attempts to overcome deficiencies of the prior art by permitting extended use of the trolling motor by utilizing solar energy to motivate the electric drive of the trolling motor in addition to external batteries. Prior art solar powered devices may be found in U.S. Pat. No. 4,628,962 to Pierce sets forth the use of a typical application of solar powered cells to drive generators, air conditioners, and the like.

U.S. Pat. No. 4,718,233 to Barrett sets forth a solar powered take-off permitting conversion of direct current electric solar generated energy to alternating current electrical energy.

U.S. Pat. No. 4,751,413 to Izawa sets forth a solar energy motor organization utilizing typical photovoltaic elements.

U.S. Pat. No. 4,570,444 to Gould sets forth a further example of a solar motor device utilizing a liquid and compressed gas interface within a hub to effect rotation of a wheel member.

U.S. Pat. No. 4,871,042 to Hsu et al. wherein an electric bicycle includes electrical powered drive mechanism operative through batteries and solar cells.

As such, it may be appreciated that there continues to be a need for a new and improved solar powered trolling motor as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of solar powered devices now present in the prior art, the present invention provides a solar powered trolling motor wherein the same utilizes solar cells of a photovoltaic type mounted on the trolling motor housing to direct converted solar energy to electrical direct current to drive an associated motor within the trolling motor organization. As such, the general purpose of the present invention, which will be described subsequently in greater detail, is to provide a new and improved solar powered trolling motor which has all the advantages of the prior art solar powered devices and none of the disadvantages.

To attain this, the present invention provides an apparatus including a trolling motor housing, including a solar cell organization permitting selective use of solar cells or a battery to motivate the trolling motor drive. Modification of the invention includes manipulation means for spacing and permitting rotation of the solar cells relative to the trolling motor housing in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar powered trolling motor which has all the advantages of the prior art solar powered devices and none of the disadvantages.

It is another object of the present invention to provide a new and improved solar powered trolling motor which may be easily and efficiently manufactured and marketed.

It is a further object of the present invention to provide a new and improved solar powered trolling motor which is of a durable and reliable construction.

An even further object of the present invention is to provide a new and improved solar powered trolling motor which is susceptible of a low cost of manufacture with regard to both materials and labor, and which accordingly is then susceptible of low prices of sale to the consuming public, thereby making such solar powered trolling motors economically available to the buying public.

Still yet another object of the present invention is to provide a new and improved solar powered trolling motor which provides in the apparatuses and methods of the prior art some of the advantages thereof, while simultaneously overcoming some of the disadvantages normally associated therewith.

Still another object of the present invention is to provide a new and improved solar powered trolling motor wherein the same permits conversion of solar energy to electrical current to drive an associated electrical trolling motor organization and further permits operative angular association of the solar cells with solar rays.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view, taken in elevation, of the instant invention.

FIG. 4 is an orthographic side view, taken in elevation, of a modification of the instant invention.

FIG. 5 is an isometric illustration of the solar cell unit of the organization as set forth in FIG. 4.

FIG. 6 is an orthographic side view, taken in elevation, of a further modified solar cell unit as utilized by the instant invention.

DESCRIPTION OF THE PREFERRED EMBODIMENT

Figure 1:
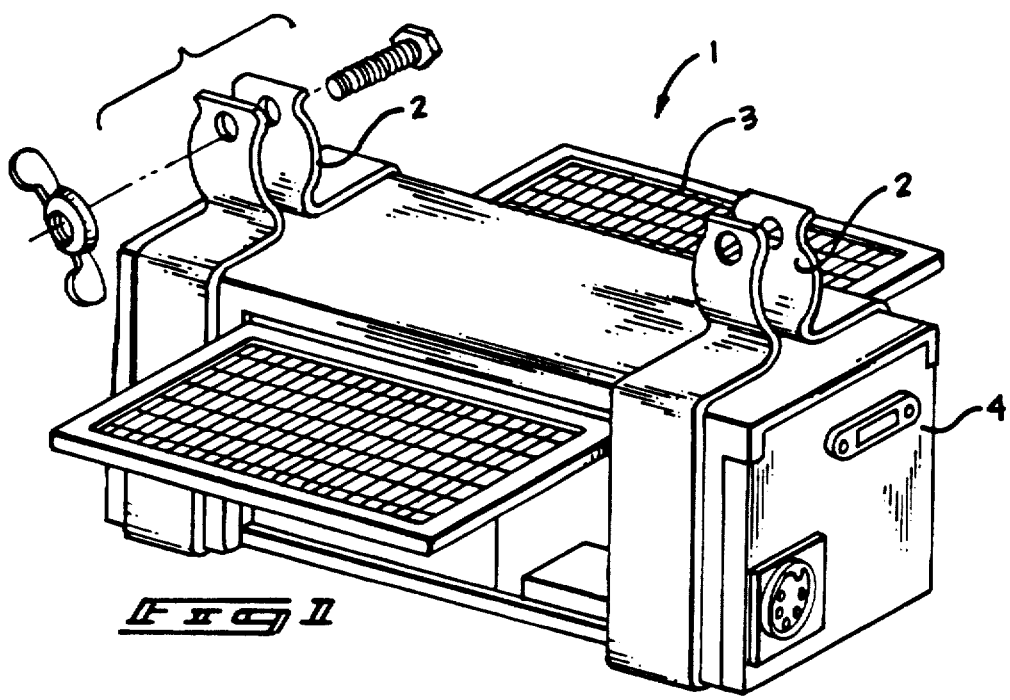
FIG. 1 is an isometric illustration of a prior art solar energy conversion device.
Figure 3:
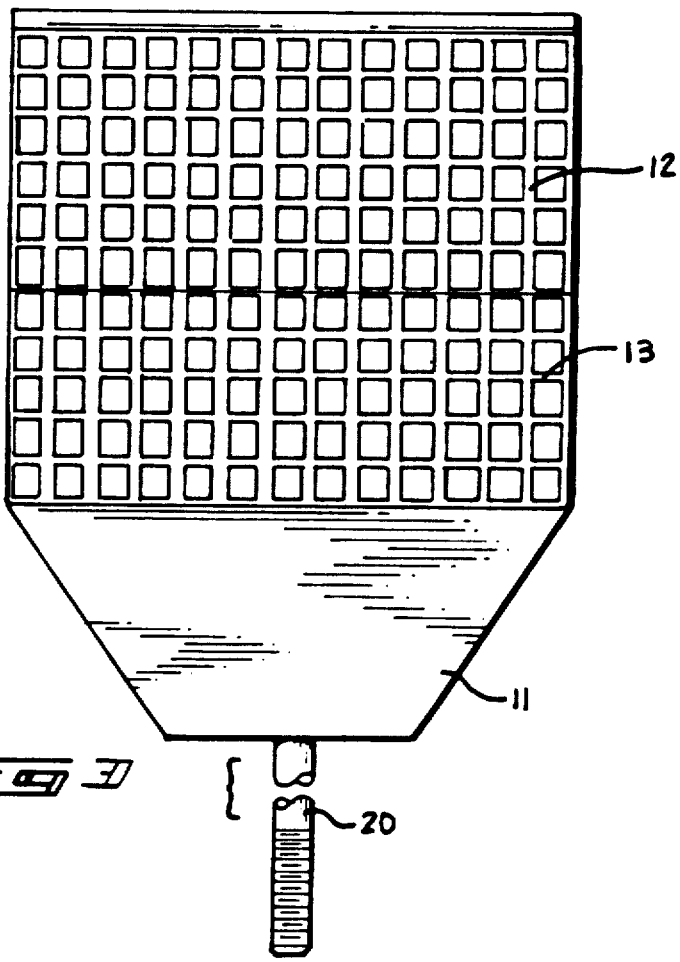
FIG. 3 is a top orthographic view of the instant invention.

With reference now to the drawings, and in particular to FIGS. 1 to 6 thereof, a new and improved solar powered trolling motor embodying the principles and concepts of the present invention and generally designated by the reference numeral 10 will be described.

FIG. 1 illustrates a prior art solar cell conversion unit 1, wherein a solar cell panel 3 mounted to a housing 4 includes bracketry 2 to mount the organization to an associated bicycle, as set forth in U.S. Pat. No. 4,871,042, utilizing batteries in operative association with the solar cells for directing current to an associated drive motor whose organization is incorporated herein by reference.

More specifically, the solar powered trolling motor 10 of the instant invention essentially comprises a housing 11, with a top surface defined by a housing rear top wall 14 arranged relative to a housing forward top wall 15 defining an acute angle therebetween. The rear wall 14 includes a first solar cell panel mounted thereon, with the forward top wall 15 including a second solar cell panel 13 fixedly mounted thereon to optimize orientation of a solar panel relative to solar reception. DC solar cell batteries 16 contained within the housing 11 are in operative association with the solar cell panels 12 in a manner as set forth in U.S. Pat. No. 4,871,042 incorporated herein by reference. Optionally, an electrical plug receptor 17 is securable with an electrical plug 18 that is in electrical communication with an electrical transmission line 19. The electrical transmission line 19 includes a first electrical connector clip 19a and a second electrical connector clip 19b for selective securement to a remote battery available to an individual due to failure of the solar cell panels or in the situation of limited solar energy available. A steering and rheostat rod 20 is provided to provide variable speed of the associated DC electrical drive motor 24 contained within a casing that is orthogonally mounted to a drive shaft column 21 mounted to the housing 11 by a collar 22. A clamp assembly 23 is typically rotatably mounted relative to the column 21 to permit relative rotation of the column 21 and steerage of the organization by orientation of the output shaft propeller 25 relative to the drive motor 24 and its associated housing.

FIG. 4 illustrates the use of a modified trolling motor organization 10a of support tube 29 that, at its lower terminal end, includes an externally threaded collar 27 receivable within an internally threaded bore 26 through the top wall of the trolling motor housing 11. A thumb wheel 28 fixedly mounted overlying the externally threaded collar 27 permits relative rotation of the collar 27 relative to the bore 26 for its association. A solar panel 30 is mounted to an upper terminal end of the support tube 29 by a pivot connection junction 31 to permit manual pivotment of the solar panel 30 relative to the support tube 29. A solar panel connector plug 32 mounted to the lower terminal end of the support tube 29 provides electrical association between the solar panel 30 when the support tube 29 is directed within the bore 26. FIG. 6 illustrates the use of a modified solar panel arrangement that further includes a pulley member 34 that is rotatably mounted adjacent to and spaced above the thumb wheel 28 and associated collar 27. An elastomeric tension cord 33 is secured at a cord forward terminal end 33a to a forward terminal end of the panel 30 and utilizes a cord rear terminal end 33b mounted adjacent the panel 30 rear terminal end such that pivotment of the panel 30 about the junction 31 maintains the panel 30 in a desired angular orientation due to the frictional tensioning of the elastomeric tension cord 33 relative to the pulley member 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar powered trolling motor comprising, in combination, a housing, the housing including a top wall, with the top wall mounting a solar panel means thereon for converting solar energy into electrical current, and the housing further including a drive shaft column fixedly mounted to a bottom wall of the housing, the drive shaft column orthogonally mounted to a drive motor housing at a lower terminal end thereof, the drive motor housing including an electric drive motor contained therewithin, with the electric drive motor mounting rotatably an output shaft and propeller exteriorly of the housing.

2. An apparatus as set forth in claim 1 further including solar batteries contained within the housing in operative association with the solar panel means for storing electrical current and directing the electrical current to the electric drive motor.

3. An apparatus as set forth in claim 2 wherein the housing includes an internally threaded bore directed through the top wall of the housing, and the solar panel means further including a support tube, the support tube including an externally threaded collar cooperative with the internally threaded bore, and the externally threaded collar including a thumb wheel member extending radially beyond the support tube, and the support tube including a connector plug mounted at a lower terminal end thereof for electrical communication with the solar batteries when the support tube is directed within the bore, and the support tube including an upper terminal end, the upper terminal end including a pivot junction, and the solar panel means further including a solar panel, the solar panel fixedly mounted to the pivot junction to permit pivoting of a solar panel relative to the support tube.

4. An apparatus as set forth in claim 3 wherein the support tube includes a pulley member rotatably mounted on the support tube adjacent to and spaced above the thumb wheel, and an elastomeric tension cord directed about the pulley member and including a forward terminal end fixedly mounted to a solar panel forward terminal end, and the elastomeric tension cord further including a rear terminal end, with the rear terminal end fixedly mounted adjacent to a solar panel rear terminal end to frictionally retain the solar panel in an angular orientation relative to the support tube, and the pivot junction mounted medially between the solar panel forward terminal end and the solar panel rear terminal end.

* * * * *